United States Patent
Akiya et al.

(10) Patent No.: US 9,790,431 B2
(45) Date of Patent: Oct. 17, 2017

(54) METHOD TO EXTRACT BITUMEN FROM OIL SANDS

(71) Applicant: Dow Global Technologies LLC, Midland, MI (US)

(72) Inventors: Naoko Akiya, Missouri City, TX (US); Felipe A. Donate, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/649,670

(22) PCT Filed: Dec. 10, 2013

(86) PCT No.: PCT/US2013/074023
§ 371 (c)(1),
(2) Date: Jun. 4, 2015

(87) PCT Pub. No.: WO2014/099466
PCT Pub. Date: Jun. 26, 2014

(65) Prior Publication Data
US 2015/0307787 A1     Oct. 29, 2015

Related U.S. Application Data

(60) Provisional application No. 61/739,279, filed on Dec. 19, 2012.

(51) Int. Cl.
*C10G 1/04*     (2006.01)
*E21B 43/24*     (2006.01)
*C08L 95/00*     (2006.01)

(52) U.S. Cl.
CPC ............... *C10G 1/04* (2013.01); *C10G 1/047* (2013.01); *E21B 43/24* (2013.01); *C08L 95/00* (2013.01)

(58) Field of Classification Search
CPC C10G 1/04; C10G 1/047; E21B 43/24; E21B 43/2401; E21B 43/2403; E21B 43/2405; E21B 43/2406; E21B 43/2408; C09K 8/584; C09K 8/592; C09K 8/602; C09K 8/604
See application file for complete search history.

(56) References Cited

U.S. PATENT DOCUMENTS

2008/0217013 A1*   9/2008   Stokes .................... C07C 29/76
                                                     166/300
2011/0309001 A1* 12/2011   Soane .................... C09K 8/524
                                                     208/390

* cited by examiner

*Primary Examiner* — Randy Boyer
*Assistant Examiner* — Brandi M Doyle

(57) ABSTRACT

The present invention relates to an improved bitumen recovery process from oil sands. The oil sands may be surface mined and transported to a treatment area or may be treated directly by means of an in situ process of oil sand deposits that are located too deep for strip mining. Specifically, the present invention involves the step of treating oil sands with a glycol ether amine described by the following structure: R—$(OC_2H_4)_x$—$NH_2$ or R—$(OCH_2CH(CH_3))_y$—$NH_2$ wherein R is a $C_1$ to $C_6$ alkyl group or a phenyl group and x and y independently are 1 to 3.

7 Claims, No Drawings

METHOD TO EXTRACT BITUMEN FROM OIL SANDS

FIELD OF THE INVENTION

The present invention relates to the recovery of bitumen from oil sands. More particularly, the present invention is an improved method for bitumen recovery from oil sands through either surface mining or in situ recovery. The improvement is the use of a glycol ether amine as an extraction aid in the water and/or steam used in the bitumen recovery process.

BACKGROUND OF THE INVENTION

Deposits of oil sands are found around the world, but most prominently in Canada, Venezuela, and the United States. These oil sands contain significant deposits of heavy oil, typically referred to as bitumen. The bitumen from these oil sands may be extracted and refined into synthetic oil or directly into petroleum products.

The difficulty with bitumen lies in that it typically is very viscous, sometimes to the point of being more solid than liquid. Thus, bitumen typically does not flow as less viscous, or lighter, crude oils do.

Because of the viscous nature of bitumen, it cannot be produced from a well drilled into the oil sands as is the case with lighter crude oil. This is so because the bitumen simply does not flow without being first heated, diluted, and/or upgraded. Since normal oil drilling practices are inadequate to produce bitumen, several methods have been developed over several decades to extract and process oil sands to remove the bitumen. For shallow deposits of oil sands, a typical method includes surface extraction, or mining, followed by subsequent treatment of the oil sands to remove the bitumen.

The development of surface extraction processes has occurred most extensively in the Athabasca field of Canada. In these processes, the oil sands are mined, typically through strip or open pit mining with draglines, bucket-wheel excavators, and, more recently, shovel and truck operations. The oil sands are then transported to a facility to process and remove the bitumen from the sands. These processes typically involve a solvent of some type, most often water or steam, although other solvents, such as hydrocarbon solvents, have been used.

After excavation, a hot water extraction process is typically used in the Athabasca field in which the oil sands are mixed with water at temperatures ranging from approximately 35° C. to 75° C., with recent improvements lowering the temperature necessary to the lower portion of the range. An extraction agent, such as sodium hydroxide (NaOH), surfactants, and/or air may be mixed with the oil sands.

Water is added to the oil sands to create an oil sands slurry, to which additives such as NaOH may be added, which is then transported to an extraction plant, typically via a pipeline. Inside a separation vessel, the slurry is agitated and the water and NaOH releases the bitumen from the oil sands. Air entrained with the water and NaOH attaches to the bitumen, allowing it to float to the top of the slurry mixture and create a froth. The bitumen froth is further treated to remove residual water and fines, which are typically small sand and clay particles. The bitumen is then either stored for further treatment or immediately treated, either chemically or mixed with lighter petroleum products, and transported by pipeline for upgrading into synthetic crude oil. Unfortunately, this method cannot be used for deeper tar sand layers.

In situ techniques are necessary to recover deeper oil in well production. It is estimated that around 80 percent of the Alberta tar sands and almost all of the Venezuelan tar sands are too far below the surface to use open pit mining.

In well production, referred to as in situ recovery, Cyclic Steam Stimulation (CSS) is the conventional "huff and puff" in situ method whereby steam is injected into the well at a temperature of 250° C. to 400° C. The steam rises and heats the bitumen, decreasing its viscosity. The well is allowed to sit for days or weeks, and then hot oil mixed with condensed steam is pumped out for a period of weeks or months. The process is then repeated. Unfortunately, the "huff and puff" method requires the site to be shut down for weeks to allow pumpable oil to accumulate. In addition to the high cost to inject steam, the CSS method typically results in 20 to 25 percent recovery.

Steam Assisted Gravity Drainage (SAGD) is another in situ method where two horizontal wells are drilled in the tar sands, one at the bottom of the formation and another five meters above it. The wells are drilled in groups off of central pads. These wells may extend for miles in all directions. Steam is injected into the upper well, thereby melting the bitumen which then flows into the lower well. The resulting liquid oil mixed with condensed steam is subsequently pumped to the surface. Typical recovery of the available oil is 40 to 60 percent.

The above methods have many cost, environmental and safety problems associated with them. For example, the use of large amounts of steam is energy intensive and requires the processing and disposal of large amounts of water. Currently, tar sands extraction and processing requires several barrels of water for each barrel of oil produced. Strip mining and further treatment results in incompletely cleaned sand, which requires further processing, before it can be returned to the environment. Further, the use of a large quantity of caustic in surface mining not only presents process safety hazards but also contributes to stability of fine clay particles in tailings, the disposal of which is a major environmental problem.

Thus, there remains a need for efficient, safe and cost-effective methods to improve the recovery of bitumen from oil sands.

SUMMARY OF THE INVENTION

The present invention is an improved bitumen recovery process comprising the step of treating oil sands with a glycol ether amine wherein the treatment is to oil sands recovered by surface mining or in situ production to oil sands in a subterranean reservoir, preferably the glycol ether amine is 2-butoxy-1-aminoethane; 2-(2-methoxyethoxy)-1-aminoethane; 2-(2-butoxyethoxy)-1-aminoethane; 1-methoxy-2-aminopropane; 1-propoxy-2-aminopropane; 1-butoxy-2-aminopropane; 1-(2-methoxy-1-methylethoxy)-2-aminopropane; 1-(2-propoxy-1-methylethoxy)-2-aminopropane; 1-(2-butoxy-1-methylethoxy)-2-aminopropane; 1-[2-(2-propoxy-1-methylethoxy)-1-methylethoxy]-2-aminopropane; or 1-[2-(2-butoxy-1-methylethoxy)-1-methylethoxy]-2-aminopropane, more preferably 2-(2-methoxyethoxy)-1-aminoethane or 1-(2-methoxy-1-methylethoxy)-2-aminopropane.

In one embodiment of the bitumen recovery process described herein above, the glycol ether amine is described by the following structure:

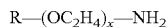

or

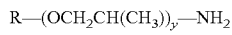

wherein R is a $C_1$ to $C_6$ alkyl group or a phenyl group, preferably a methyl group and x and y independently are 1 to 3, preferably 2.

In another embodiment of the present invention, the bitumen recovery process by surface mining described herein above comprises the steps of: i) surface mining oil sands, ii) preparing an aqueous slurry of the oil sands, iii) treating the aqueous slurry with the glycol ether amine, iv) agitating the treated aqueous slurry, v) transferring the agitated treated aqueous slurry to a separation tank, and vi) separating the bitumen from the aqueous portion, preferably the glycol ether amine is present in the aqueous slurry in an amount of from 0.1 to 10 weight percent based on the weigth of the oil sands.

In another embodiment of the present invention, the bitumen recovery process by in situ production described herein above comprises the steps of: i) treating a subterranean reservoir of oil sands by injecting steam containing the glycol ether amine into a well, and ii) recovering the bitumen from the well, preferably the concentration of the glycol ether amine in the steam is in an amount of from 100 ppm to 10 weight percent.

DETAILED DESCRIPTION OF THE EMBODIMENTS

The separation of bitumen and/or heavy oil from oil sands is accomplished by, but not limited to, two methods, surface mining or in situ recovery sometimes referred to as well production. The oil sands may be recovered by surface, or strip mining and transported to a treatment area. A good summary can be found in the article "Understanding Water-Based Bitumen Extraction from Athabasca Oil Sands", J. Masliyah, et al., *Canadian Journal of Chemical Engineering*, Volume 82, August 2004. The basic steps in bitumen recovery include via surface: mining, extraction, froth treatment, water management-tailing ponds/thickener, and upgrading. The steps are interrelated, the mining operation affects the extraction and in turn the extraction affects the upgrading operation.

Typically, in commercial bitumen recovery operations, the oil sand is mined in open-pit mine using trucks and shovels. The mined oil sands are transported to a treatment area. The extraction step includes crushing the oil sand lumps and mixing them with (recycle process) water in mixing boxes, stirred tanks, cyclo-feeders or rotary breakers to form a conditioned oil sands slurry. The conditioned oil sands slurry is introduced to hydrotransport pipelines or to tumblers, where the oil sand lumps are sheared and size reduction takes place. Within the tumblers and/or the hydrotransport pipelines bitumen is recovered or "released", or "liberated", from the sand grains. Chemical additives can be added during the slurry preparation stage, for examples of chemicals known in the art see U.S. 2008/0139418, incorporated by reference herein in its entirety. In typical operations, the operating slurry temperature ranges from 35° C. to 75° C., preferably 40° C. to 55° C.

Entrained or introduced air attaches to bitumen in the tumblers and hydrotransport pipelines creating froth. In the froth treatment step, the aerated bitumen floats and is subsequently skimmed off from the slurry. This is accomplished in large gravity separation vessels, normally referred to as primary separation vessels (PSV), separation cells (Sep Cell) or primary separation cells (PSC). Small amount of bitumen droplets (usually un-aerated bitumen) remaining in the slurry is further recovered using either induced air flotation in mechanical flotation cells and tailings oil recovery vessels, or cyclo-separators and hydrocyclones. Generally, overall bitumen recovery in commercial operations is about 88 to 95 percent. The recovered bitumen in the form of froth normally contains 60 percent bitumen, 30 percent water and 10 percent solids.

The bitumen froth recovered as such is then de-aerated, and diluted (mixed) with solvents to provide sufficient density difference between water and bitumen and to reduce the bitumen viscosity. The dilution by a solvent (e.g., naphtha or hexane) facilitates the removal of the solids and water from the bitumen froth using inclined plate settlers, cyclones and/or centrifuges. When a paraffinic diluent (solvent) is used at a sufficiently high diluent to bitumen ratio, partial precipitation of asphaltenes occurs. This leads to the formation of composite aggregates that trap the water and solids in the diluted bitumen froth. In this way gravity separation is greatly enhanced, potentially eliminating the need for cyclones or centrifuges.

In the water treatment—tailing ponds/thickener step, the tailings stream from the extraction plant goes to the tailings pond for solid-liquid separation. The clarified water is recycled from the pond back to the extraction plant. To accelerate tailings handling, gypsum may be added to mature fine tailings to consolidate the fines together with the coarse sand into a non-segregating mixture. This method is referred to as consolidated (composite) tailing (CT) process. CT is disposed of in a geotechnical manner that enhances its further dewatering and eventual reclamation. Optionally, tailings from the extraction plant are cycloned, with the overflow (fine tailings) being pumped to thickeners and the cyclone underflow (coarse tailings), to the tailings pond. Fine tailings are treated with flocculants, then thickened and pumped to a tailings pond. Further, the use of paste technology (addition of flocculants/polyelectrolytes) or a combination of CT and paste technology may be used for fast water release and recycle of the water in CT to the extraction plant for bitumen recovery from oil sands.

In the final step, the recovered bitumen is upgraded. Upgrading either adds hydrogen or removes carbon in order to achieve a balanced, lighter hydrocarbon that is more valuable and easier to refine. The upgrading process also removes contaminants such as heavy metals, salt, oxygen, nitrogen and sulfur. The upgrading process includes one or more steps such as: distillation wherein various compounds are separated by physical properties, coking, hydro-conversion, solvent deasphalting to improve hydrogen to carbon ratio, and hydrotreating which removes contaminants such as sulfur.

In one embodiment of the present invention, the improvement to the process of recovering bitumen from oil sands it the addition of a glycol ether amine during the slurry preparation stage. The sized material is added to a slurry tank with agitation and combined with a glycol ether amine. The glycol ether amine is may be added to the oil sands slurry neat or as an aqueous solution having a concentration of from 100 ppm to 10 weight percent glycol ether amine based on the total weight of the glycol ether amine solution.

Preferably the glycol ether amine is present in the aqueous oil sands slurry in an amount of from 0.1 to 10 weight percent based on the weight of the oil sands.

Preferred glycol ether amines of the present invention are represented by one or more of the following formulas:

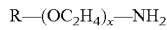

or

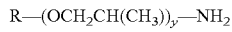

wherein R is $C_1$ to $C_6$ alkyl group or a phenyl group, preferably a methyl group and
x and y independently are 1 to 3, preferably 2.

Preferred glycol ether amines of the present invention are 2-butoxy-1-aminoethane; 2-(2-methoxyethoxy)-1-aminoethane; 2-(2-butoxyethoxy)-1-aminoethane; 1-methoxy-2-aminopropane; 1-propoxy-2-aminopropane; 1-butoxy-2-aminopropane; 1-(2-methoxy-1-methylethoxy)-2-aminopropane; 1-(2-propoxy-1-methylethoxy)-2-aminopropane; 1-(2-butoxy-1-methylethoxy)-2-aminopropane; 1-[2-(2-propoxy-1-methylethoxy]-1-methylethoxy]-2-aminopropane; or 1-[2-(2-butoxy-1-methylethoxy)-1-methylethoxy]-2-aminopropane, more preferably 2-(2-methoxyethoxy)-1-aminoethane or 1-(2-methoxy-1-methylethoxy)-2-aminopropane.

The glycol ether solution/oil sand slurry is typically agitated from 5 minutes to 4 hours, preferably as hour or less. Preferably, the glycol ether amine solution oil sands slurry is heated to equal to or greater than 35° C., more preferably equal to or greater than 40° C., more preferably equal to or greater than 55° C., more preferably equal to or greater than 60° C. Preferably, the glycol ether amine solution oil sands slurry is heated to equal to or less than 100° C., more preferably equal to or less than 80° C., and more preferably equal to or less than 75° C.

As outlined herein above, the glycol ether amine treated slurry may be transferred to a separation tank, typically comprising a diluted detergent solution, wherein the bitumen and heavy oils are separated from the aqueous portion. The solids and the aqueous portion may further be treated to remove any additional free organic matter.

In another embodiment of the present invention, bitumen is recovered from oil sands through well production wherein the glycol ether amine as described herein above can be added to oil sands by means of in situ treatment of the oil sand deposits that are located too deep for strip mining. The two most common methods of in situ production recovery are cyclic steam stimulation (CSS) and steam-assisted gravity drainage (SAGD). CSS can utilize both vertical and horizontal wells that alternately inject steam and pump heated bitumen to surface, forming a cycle of injection, heating, flow and extraction. SAGD utilizes pairs of horizontal wells placed one over the other within the bitumen pay zone. The upper well is used to inject steam, creating a permanent heated chamber within which the heated bitumen flows by gravity to the lower well, which extracts the bitumen. However, new technologies, such as vapor recovery extraction (VAPEX) cold heavy oil production with sand (CHOPS) are being developed.

The basic steps in the in situ treatment to recover bitumen form oil sands includes: steam injection into a well, recovery of bitumen from the well, and dilution of the recovered bitumen, for example with condensate, for shipping by pipelines.

In accordance with this method, the glycol ether amine is used as a steam additive in a bitumen recovery process from a subterranean oil sand reservoir. The mode of steam injection may include one or more of steam drive, steam soak, or cyclic steam injection in a single or multi-well program. Water flooding may be used in addition to one or more of the steam injection methods listed herein above.

Typically, the steam is injected into an oil sands reservoir through an injection well, and wherein formation fluids, comprising reservoir and injection fluids, are produced either through an adjacent production well or by back flowing into the injection well.

In most oil sand reservoirs, a steam temperature of at least 180° C., which corresponds to a pressure of 150 psi (1.0 MPa), or greater is needed to mobilize the bitumen. Preferably, the glycol ether amine-steam injection stream is introduced to the reservoir at a temperature in the range of from 150° C. to 300° C., preferably 180° C. to 260° C. The particular steam temperature and pressure used in the process of the present invention will depend on such specific reservoir characteristics as depth, overburden pressure, payzone thickness, and bitumen viscosity, and thus will be worked out for each reservoir.

It is preferable to inject the glycol ether amine simultaneously with the steam in order to ensure or maximize the amount of glycol ether amine actually moving with the steam. In some instances, it may be desirable to precede or follow a steam-glycol ether amine injection stream with a steam-only injection stream. In this case, the steam temperature can be raised above 260° C. during the steam-only injection. The term "steam" used herein is meant to include superheated steam, saturated steam, and less than 100 percent quality steam.

For purposes of clarity, the term "less than 100 percent quality steam" refers to steam having a liquid water phase present. Steam quality is defined as the weight percent of dry steam contained in a unit weight of a steam-liquid mixture. "Saturated steam" is used synonymously with "100 percent quality steam". "Superheated steam" is steam which has been heated above the vapor-liquid equilibrium point. If super heated steam is used, the steam is preferably super heated to between 5 to 50° C. above the vapor-liquid equilibrium temperature, prior to adding the glycol ether amine.

The glycol ether amine may be added to the steam neat or as a concentrate. If added as a concentrate, it may be added as a 1 to 99 weight percent solution in water. Preferably, the glycol ether amine is substantially volatilized and carried into the reservoir as an aerosol or mist. Here again, the rationale is to maximize the amount of glycol amine traveling with the steam into the reservoir.

The glycol ether amine is preferably injected intermittently or continuously with the steam, so that the steam-glycol ether amine injection stream reaches the downhole formation through common tubing. The rate of glycol ether amine is adjusted so as to maintain the preferred glycol ether amine concentration of 100 ppm to 10 weight percent in steam. The rate of steam injection for a typical oil sands reservoir might be in the order of enough steam to provide an advance through the formation of from 1 to 3 feet/day.

EXAMPLES

The glycol ether amines, listed in Table 1, are either commercially available or may be produced by any known reductive amination process. The glycol ether amines used in Examples 1 to 11 are described by the following formulas:

$$R-(OC_2H_4)_x-NH_2$$

or $$R-(OCH_2CH(CH_3))_y-NH_2$$

TABLE 1

| x | y | R | Glycol Ether Amine |
|---|---|---|---|
| 1 |   | $C_4$ | 2-butoxy-1-aminoethane |
| 2 |   | $C_1$ | 2-(2-methoxyethoxy)-1-aminoethane |
| 2 |   | $C_4$ | 2-(2-butoxyethoxy)-1-aminoethane |
|   | 1 | $C_1$ | 1-methoxy-2-aminopropane |
|   | 1 | $C_3$ | 1-propoxy-2-aminopropane |
|   | 1 | $C_4$ | 1-butoxy-2-aminopropane |
|   | 2 | $C_1$ | 1-(2-methoxy-1-methylethoxy)-2-aminopropane |
|   | 2 | $C_3$ | 1-(2-ropoxy-1-methylethoxy)-2-aminopropane |
|   | 2 | $C_4$ | 1-(2-butoxy-1-methylethoxy)-2-aminopropane |
|   | 3 | $C_3$ | 1-[2-(2-propoxy-1-methylethoxy)-1-methylethoxy]-2-aminopropane |
|   | 3 | $C_4$ | 1-[2-(2-butoxy-1-methylethoxy)-1-methylethoxy]-2-aminopropane |

Examples 1 to 11 comprise 4.5 g of 1% aqueous glycol ether amine solution combined with 0.5 g of mined high grade Athabasca oil sands. The mixture is shaken, heated, and allowed to boil for 1 hour.

The glycol ether amine/oil sand slurries of Example 1 to 11 are screened visually and qualitatively compared to the amount of oil recovery as compared to an identical treatment of the oil sands with water alone; results are reported in Table 2. The apparent oil recovery is judged based on the formation of free oil at the air-liquid interface (primary indicator) and occurrence of turbidity and color in the solution (secondary indicator). Based on the visual assessment, improved recovery is rated "+", moderately improved recovery is rated "++", and significantly improved recovery is rated "+++".

TABLE 2

| Example | Glycol Ether Amine | Improvement |
|---|---|---|
| 1 | 2-butoxy-1-aminoethane | + |
| 2 | 2-(2-methoxyethoxy)-1-aminoethane | +++ |
| 3 | 2-(2-butoxyethoxy)-1-aminoethane | ++ |
| 4 | 1-methoxy-2-aminopropane | ++ |
| 5 | 1-propoxy-2-aminopropane | ++ |
| 6 | 1-butoxy-2-aminopropane | ++ |
| 7 | 1-(2-methoxy-1-methylethoxy)-2-aminopropane | +++ |
| 8 | 1-(2-propoxy-1-methylethoxy)-2-aminopropane | ++ |
| 9 | 1-(2-butoxy-1-methylethoxy)-2-aminopropane | + |
| 10 | 1-[2-(2-propoxy-1-methylethoxy)-1-methylethoxy]-2-aminopropane | + |
| 11 | 1-[2-(2-butoxy-1-methylethoxy)-1-methylethoxy]-2-aminopropane | + |

Example 12 is the injection of steam containing a 1100 ppm concentration of the glycol ether amine of Example 5 in a lab-scale steam flooding experiment. Comparative Example A is the injection of steam only. A 1.6 inch i.d. stainless steel chamber is packed with 100 g of high-grade mined Athabasca oil sand. Steam is injected at a rate of 4.5 ml/min liquid water equivalent. Steam pressure is set to 50 psig for the first hour, 100 psig for the next 30 minutes, and 320 psig for the next hour. The total bitumen recovery for Example 12 was 38 percent. The total bitumen recovery for Comparative Example A was 30 percent. Example 12 demonstrates an 8 percent absolute increase in bitumen recovery from the oil sands as compared to Comparative Example A.

What is claimed is:

1. A bitumen recovery process comprising the step of treating oil sands with a glycol ether amine wherein the treatment is to oil sands recovered by surface mining or in situ production wherein the glycol ether amine is described by the following structure:

$$R-(OC_2H_4)_x-NH_2$$

or $$R-(OCH_2CH(CH_3))_y-NH_2$$

wherein R is a $C_1$ to $C_6$ alkyl group or a phenyl group and x and y independently are 1 to 3.

2. The bitumen recovery process of claim 1 by surface mining comprising the steps of:
   i) surface mining oil sands,
   ii) preparing an aqueous slurry of the oil sands,
   iii) treating the aqueous slurry with the glycol ether amine,
   iv) agitating the treated aqueous slurry,
   v) transferring the agitated treated aqueous slurry to a separation tank, and
   vi) separating the bitumen from the aqueous portion.

3. The bitumen recovery process of claim 2 wherein the glycol ether amine is present in the aqueous slurry in an amount of from 0.1 to 10 weight percent based on the weight of the oil sands.

4. The bitumen recovery process of claim 1 by in situ production comprising the steps of:
   i) treating a subterranean reservoir of oil sands by injecting steam containing the glycol ether amine into a well, and
   ii) recovering the bitumen from the well.

5. The bitumen recovery process of claim 4 wherein the concentration of the glycol ether amine in the steam is in an amount of from 100 ppm to 10 weight percent.

6. The process of claim 1 wherein the glycol ether amine is 2-butoxy-1-aminoethane; 2-(2-methoxyethoxy)-1-aminoethane; 2-(2-butoxyethoxy)-1-aminoethane; 1-methoxy-2-aminopropane; 1-propoxy-2-aminopropane; 1-butoxy-2-aminopropane; 1-(2-methoxy-1-methylethoxy)-2-aminopropane; 1-(2-propoxy-1-methylethoxy)-2-aminopropane; 1-(2-butoxy-1-methylethoxy)-2-aminopropane; 1-[2-(2-propoxy-1-methylethoxy)-1-methylethoxy]-2-aminopropane; or 1-[2-(2-butoxy-1-methylethoxy)-1-methylethoxy]-2-aminopropane.

7. The process of claim 1 wherein the glycol ether amine is 2-(2-methoxyethoxy)-1-aminoethane or 1-(2-methoxy-1-methylethoxy)-2-aminopropane.

\* \* \* \* \*